(12) United States Patent
Seok

(10) Patent No.: US 11,560,970 B1
(45) Date of Patent: Jan. 24, 2023

(54) PVC HOSE WITH LEAK NOTIFICATION FUNCTION

(71) Applicant: SEJONG FLEX CO., LTD., Gimhae-si (KR)

(72) Inventor: Jong Min Seok, Busan (KR)

(73) Assignee: SEJONG FLEX CO., LTD., Gimhae-si (KR)

(*) Notice: Subject to any disclaimer, the term of this patent is extended or adjusted under 35 U.S.C. 154(b) by 0 days.

(21) Appl. No.: 17/485,753

(22) Filed: Sep. 27, 2021

(30) Foreign Application Priority Data

Sep. 16, 2021 (KR) .......................... 10-2021-0123686

(51) Int. Cl.
*F16L 11/12* (2006.01)
*F16L 11/08* (2006.01)

(52) U.S. Cl.
CPC ............ *F16L 11/12* (2013.01); *F16L 11/086* (2013.01)

(58) Field of Classification Search
CPC .............................. F16L 11/12; F16L 11/086
USPC ..................................... 138/36, 104
See application file for complete search history.

(56) References Cited

U.S. PATENT DOCUMENTS

| | | | | |
|---|---|---|---|---|
| 4,215,384 A * | 7/1980 | Elson | ........................ | H05F 3/02 174/47 |
| 4,446,892 A * | 5/1984 | Maxwell | ............... | G01M 3/045 138/104 |
| 5,714,681 A * | 2/1998 | Furness | ................. | G01M 3/283 73/40.5 R |
| 5,969,618 A * | 10/1999 | Redmond | ............... | G01M 3/18 285/8 |
| 6,305,423 B1 * | 10/2001 | De Meyer | ............. | F16L 11/127 138/104 |
| 6,305,427 B1 * | 10/2001 | Priest, II | ................. | F16L 11/12 138/104 |
| 8,087,430 B1 * | 1/2012 | Betz | ........................ | F16L 11/20 138/104 |
| 9,267,636 B2 * | 2/2016 | Chamberland | ......... | F16L 57/06 |
| 9,588,074 B2 * | 3/2017 | Demanze | .............. | F16L 11/127 |
| 2002/0046776 A1 * | 4/2002 | Kirjavainen | ........... | B29C 44/22 138/104 |
| 2014/0366975 A1 * | 12/2014 | Allison | ................. | G01M 3/047 29/407.01 |

* cited by examiner

*Primary Examiner* — Craig M Schneider
*Assistant Examiner* — David R Deal
(74) *Attorney, Agent, or Firm* — United One Law Group LLC; Kongsik Kim; Jhongwoo Peck

(57) ABSTRACT

Disclosed herein is a polyvinyl chloride (PVC) hose with a leak notification function. The PVC hose includes: an inner layer configured such that a fluid is transferred through a hollow; a reinforcing yarn layer wound around the inner layer, and configured to increase the pressure of the inner layer and restrain expansion; an intermediate layer formed through coating around the reinforcing yarn layer; a first electrode layer formed through coating around the intermediate layer, and provided with a first terminal; a partition layer formed through coating around the first electrode layer; a second electrode layer formed through coating around the partition layer, and provided with a second terminal; a high-density woven yarn layer processed around the second electrode layer; an outer coating layer formed through coating around the high-density woven yarn layer; and a leak detection device configured to determine whether there is a leak depending on whether current is conducted.

5 Claims, 3 Drawing Sheets

PVC HOSE WITH LEAK NOTIFICATION FUNCTION

CROSS-REFERENCE TO RELATED APPLICATION

This application claims the benefit of Korean Patent Application No. 10-2021-0123686 filed on Sep. 16, 2021, which application is incorporated herein by reference in its entirety.

BACKGROUND

1. Technical Field

The present invention relates to a polyvinyl chloride (PVC) hose with a leak notification function, and more particularly to a PVC hose that has an increased lifespan and the function of detecting whether there is a leak inside the hose through two electrode layers therein.

2. Description of the Related Art

In general, conventional PVC hoses are hardened when used for a long period of time, thereby shortening their lifespan and also causing rupture due to the poor flow of a fluid.

In addition, since a harmful fluid is present among the fluids moving through PVC hoses, there is a need to accurately identify a leak in a PVC hose in its early stage and deliver a notification signal to an administrator.

In connection with this, there has been disclosed a related art leak detection hose in which a conductive wire is spirally wound on the outer circumferential surface of a PVC hose tubular body at a predetermined pitch interval and the presence or absence of a leak and the location of the leak are determined based on a detection signal transmitted from the conductive wire to one end area of the tubular body.

However, the related art leak detection hose is problematic in that a leak occurs in the tubular body in an area corresponding to the pitch interval, a leak cannot be detected until a leaked fluid comes into contact with the conductive wire, and the related art leak detection hose is used only when the fluid flowing inside an inner layer is oil and a chemical product is a fluid because a partition layer is made of natural rubber.

RELATED ART DOCUMENTS

Patent Documents

Patent document 1: Korean Patent Application Publication No. 10-2019-0063725 (published on Jun. 10, 2019)
Patent document 2: Korean Patent Application Publication No. 10-2017-0101407 (published on Sep. 6, 2017)

SUMMARY

The present invention has been conceived to overcome the above-described problems, and an object of the present invention is to increase the lifespan of a PVC hose, prevent the rupture of a PVC hose, and provide a PVC hose with a leak notification function that can rapidly and accurately detect whether there is a leak before the fluid flowing inside the inner layer is leaked to the outside in case of damage or a crack and then provide leak notification.

Another object of the present invention is to detect whether there is a leak when the fluid flowing inside an inner layer is oil and a chemical product is a fluid, as well as when the fluid flowing inside the inner layer is water.

In order to accomplish the above objects, the present invention provides a PVC hose with a leak notification function, the PVC hose including: an inner layer configured such that a fluid is transferred through a hollow formed therethrough; a reinforcing yarn layer wound to surround the outer circumferential surface of the inner layer, and configured to increase the pressure of the inner layer and restrain expansion; an intermediate layer formed through coating to surround the outer circumferential surface of the reinforcing yarn layer; a first electrode layer formed through coating to surround the outer circumferential surface of the intermediate layer, and provided with a first terminal at one end thereof; a partition layer formed through coating to surround the outer circumferential surface of the first electrode layer; a second electrode layer formed through coating to surround the outer circumferential surface of the partition layer, and provided with a second terminal at one end thereof; a high-density woven yarn layer processed to surround the outer circumferential surface of the second electrode layer; an outer coating layer formed through coating to surround the outer circumferential surface of the high-density woven yarn layer; and a leak detection device configured to determine whether there is a leak depending on whether current is conducted between the first terminal and the second terminal when power is applied to the first terminal and the second terminal.

The inner layer may be formed by extruding PVC.

The reinforcing yarn layer may be woven by braiding a reinforcing yarn, manufactured using polyester, on the outer circumferential surface of the inner layer.

The intermediate layer may be formed through coating on the outer circumferential surface of the reinforcing yarn layer by using PVC.

The first electrode layer may be made of a material having electrical conductivity on the surface of the intermediate layer, and a first terminal may be provided at one end of the first electrode layer.

The partition layer may be formed to be made of a material soluble in the fluid flowing inside the inner layer 100 and to surround the first electrode layer. The partition layer may be made of natural rubber when the fluid flowing inside the inner layer is oil and a chemical product is a fluid, and may be composed of two paper layers and a powder mixed layer between the paper layers when the fluid flowing inside the inner layer is water.

In this case, the powder mixed layer may be formed by adding 0.01 to 0.1% of copper powder to the $CaCl_2$ powder between the two paper layers and then applying a water-soluble adhesive.

The second electrode layer may be made of an electrically conductive material on the surface of the partition layer, and a second terminal may be provided at one end of the second electrode layer.

The high-density woven layer may be woven by weaving an ultra-high tenacity yarn, manufactured using polyester, on the outer circumferential surface of the second electrode layer.

The outer coating layer may be formed by fixedly coating the surface of the high-density woven yarn layer with PTC to surround the outer circumferential surface of the high-density woven yarn layer.

The PVC hose with a leak notification function may include the leak detection device that detects a leak depending on whether current is conducted between the first terminal and the second terminal by a connected power source.

The leak detection device may include a leak detection device body, two external terminal wires connected to the first terminal and the second terminal, respectively, a power supply device configured to supply power to the external terminal wires, and a signal generator connected to the external terminal wires and configured to generate a signal when current is conducted due to the occurrence of a leak.

When a leak of the fluid moving inside the inner layer occurs, current can be conducted between the first electrode layer and the second electrode layer. Accordingly, current is conducted between the first terminal and the second terminal by the power applied from the power supply, so that a signal is generated in the signal generator and delivers information about whether there is a leak.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described with reference to the accompanying drawings below in order to describe the present invention in detail so that a person having ordinary skill in the art to which the present invention pertains can easily implement the technical spirit of the present invention.

However, the following embodiments are merely examples intended to help the understanding of the present invention, and the scope of the present invention is not reduced or limited by the embodiments. Furthermore, the present invention may be embodied in various different forms, and is not limited to the embodiments described herein.

Figure 1:
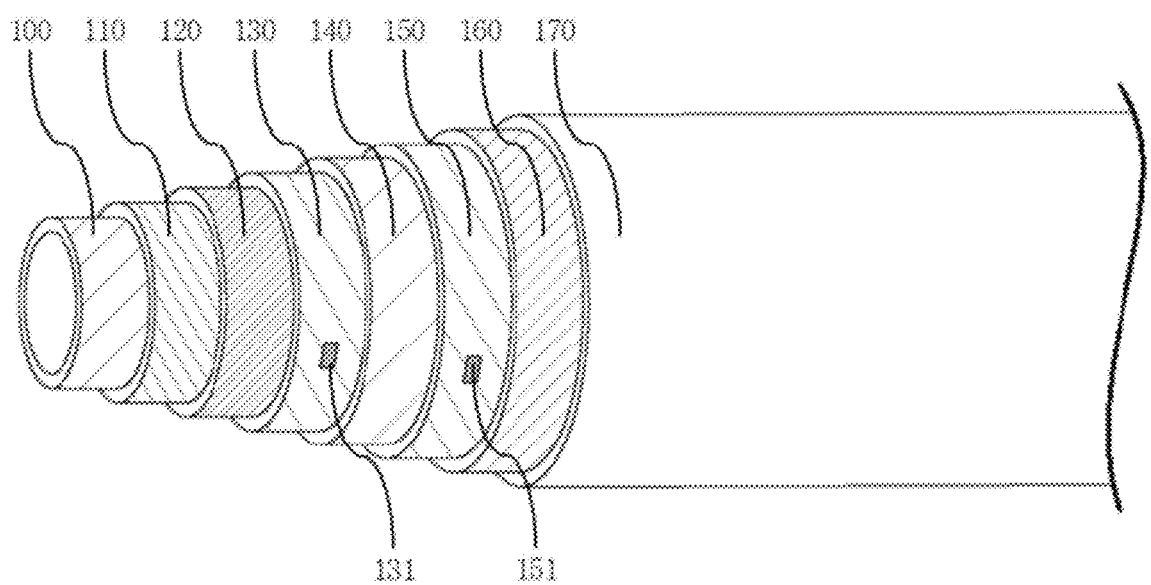
FIG. 1 is a perspective view showing a PVC hose with a leak notification function according to a preferred embodiment of the present invention.
Figure 2:
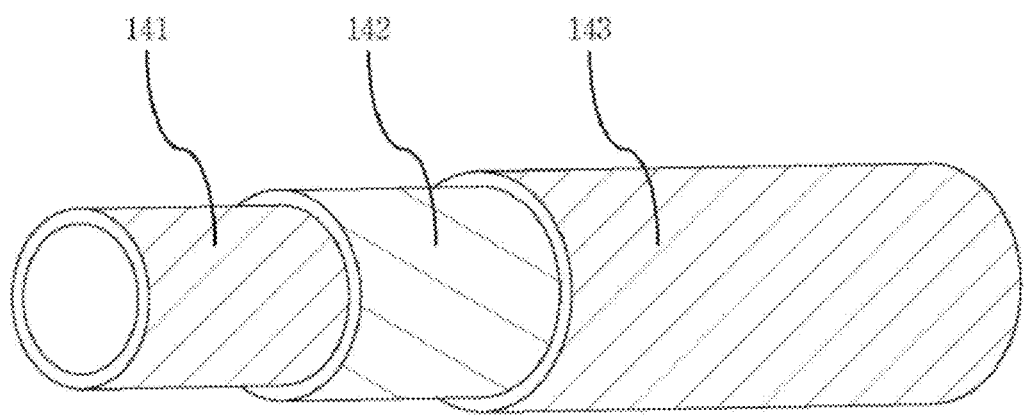
FIG. 2 is a perspective view showing a partition layer when the fluid flowing inside an inner layer according to an embodiment of the present invention is water.

FIG. 1 is a perspective view showing a PVC hose with a leak notification function according to a preferred embodiment of the present invention.

Referring to FIG. 1, the PVC hose with a leak notification function according to the present embodiment includes an inner layer 100, a reinforcing yarn layer 110, an intermediate layer 120, a first electrode layer 130, a first terminal 131, a partition layer 140, a second electrode layer 150, a second terminal 151, a high-density woven yarn layer 160, and an outer coating layer 170.

The inner layer 100 is formed by extruding PVC.

The reinforcing yarn layer 110 is woven by braiding reinforcing yarn, manufactured using polyester, on the outer circumferential surface of the inner layer 100.

The intermediate layer 120 is formed through coating on the outer circumferential surface of the reinforcing yarn layer 110 by using PVC.

The first electrode layer 130 is made of a material having electrical conductivity on the surface of the intermediate layer 120, and a first terminal is provided at one end of the first electrode layer 130.

The partition layer 140 is formed to be made of a material soluble in the fluid flowing inside the inner layer 100 and to surround the first electrode layer 130. The partition layer 140 is made of natural rubber when the fluid flowing inside the inner layer 100 is oil and a chemical product is a fluid, and is composed of two paper layers 141 and 143 and a powder mixed layer 142 between the paper layers 141 and 143 when the fluid flowing inside the inner layer 100 is water.

The powder mixed layer 142 serves to conduct current between the first electrode layer 130 and the second electrode layer 150 when a leak occurs in the case where the fluid flowing inside the inner layer 100 is water, and needs to have high solubility in water and high electrical conductivity in aqueous solution.

Experimental Example 1: Measurement of Electrical Conductivity in Aqueous Solution The electrical conductivity of electrolytes widely used in the process was measured according to ppm in aqueous solution states.

TABLE 1

Electrical conductivity measurement results (µS/cm), 25° C.

| ppm | | 1 | 3 | 10 | 30 | 100 | 300 | 1000 | 3000 |
|---|---|---|---|---|---|---|---|---|---|
| Example 1 | NaCl | 2.3 | 6.5 | 22 | 65 | 210 | 617 | 1990 | 5690 |
| Example 2 | CaCl$_2$ | 2.5 | 6.7 | 25 | 70 | 230 | 670 | 2080 | 5900 |
| Example 3 | KNO$_3$ | 1.5 | 4 | 14 | 40 | 130 | 390 | 1300 | 3700 |
| Comparative example 1 | distilled water | | | | | 0.5 | | | |
| Comparative example 2 | boiler water | | | | | | 1 | | |
| Comparative example 3 | tap water | | | | | | 50 | | |

Experimental Example 2: Solubility in Water

The following solubility is the solubility of electrolytes, widely used in the above process, in water.

TABLE 2

Solubility measurement results (g/water 100 g)

| Temperature (°C) | | 10 | 20 | 30 | 40 | 50 |
|---|---|---|---|---|---|---|
| Example 1 | NaCl | 33 | 34 | 35 | 36 | 37 |
| Example 2 | CaCl$_2$ | 63 | 74 | 100 | 128 | 137 |
| Example 3 | KNO$_3$ | 19 | 30 | 44 | 63 | 87 |

As shown in Tables 1 and 2, CaCl$_2$ of example 2 has high electrical conductivity in an aqueous solution state and high solubility in water.

Experimental Example 3: Electrical Conductivity Upon Addition of Metal

The powders of metals widely used in the above process were added to CaCl$_2$ powder, and then electrical conductivity was measured according to the ratio of the metals.

TABLE 3

Electrical conductivity in the case where metal is added to CaCl₂ powder (μS/cm), 100 ppm, 25° C.

| % by weight of metal | | 0.001 | 0.01 | 0.1 |
| --- | --- | --- | --- | --- |
| Example 4 | gold | 682 | 4750 | 45430 |
| Example 5 | silver | 860 | 6530 | 63230 |
| Example 6 | copper | 826 | 6190 | 59830 |
| Example 7 | aluminum | 607 | 4000 | 37930 |
| Example 8 | iron | 329 | 1223 | 10160 |

In this experiment, it was seen that the electrical conductivity of examples 4, 5, and 6 was increased by measuring the electrical conductivity after the metals were added to the $CaCl_2$ powder.

In this case, when the increases in electrical conductivity for the purchase costs of the metals of examples 4, 5, and 6 were compared with one another, the increase in electrical conductivity for the purchase cost of the copper of example 6 was 8193 times higher than that for the gold of example 4, and was 79 times higher than that for the silver of example 5. Accordingly, it is preferable to contain 0.01% or more of copper powder of the copper of example 6.

In this case, when 0.1% or more of the copper of example 6 was added, the electrical conductivity of the powder mixed layer 142 was high, with the result that there occurred a case where even when a leak did not occur, erroneous operation was performed, and thus a leak signal was transmitted.

Therefore, in the PVC hose with a leak notification function according to the present invention, when the fluid flowing inside the inner layer 100 was water, the electrical conductivity was measured after adding the metals to the $CaCl_2$ powder in this experiment and it was confirmed that the electrical conductivity of example 4, example 5, and example 6 was increased.

In this case, when the increases in electrical conductivity for the purchase costs of the metals of examples 4, 5, and 6 were compared with one another, the increase in electrical conductivity for the purchase cost of the copper of example 6 was 8193 times higher than that for the gold of example 4 and was 79 times higher than that for the silver of example 5. Accordingly, it is preferable to contain 0.01% or more of copper powder of the copper of example 6.

In this case, when 0.1% or more of the copper of example 6 was added, the electrical conductivity of the powder mixed layer 142 was high, and thus there occurred a case where even when a leak did not occur, erroneous operation was performed, and thus a leak signal was transmitted.

Therefore, in the PVC hose with a leak notification function according to the present invention, when the fluid flowing inside the inner layer 100 is water, the partition layer 140 is formed to include the two paper layers 141 and 143 and the powder mixing layer 142 formed by adding 0.01 to 0.1% of copper powder to $CaCl_2$ between the two paper layers 141 and 143 and then applying a water-soluble adhesive. Accordingly, the related art hose with a leak detection function is only used when the fluid flowing inside the inner layer is oil and a chemical product is a fluid because the partition layer of the related art hose with a leak detection function are made of natural rubber, whereas the PVC hose with a leak notification function according to the present invention may be used even when the fluid flowing inside the inner layer 100 of the present invention is water.

As a result, when the fluid flowing inside the inner layer 100 is water, current needs to be smoothly conducted between the first electrode layer 130 and the second electrode layer 150 when a leak occurs. To this end, the partition layer 140 is configured to include the powder mixed layer 142 formed by adding 0.01 to 0.1% of copper powder to the $CaCl_2$ powder between the two paper layers 141 and 143 and then applying a water-soluble adhesive.

For example, when a leak occurs in the hose, the fluid flowing inside the inner layer 100 passes through the reinforcement yarn layer 110, the intermediate layer 120, and the first electrode layer 130, and reaches the partition layer 140.

In this case, the partition layer 140 is dissolved due to contact with the fluid, so that the first electrode layer 130 and the second electrode layer 150 come into contact with each other, with the result that current is conducted, and thus a leak in the hose can be detected. When the fluid flowing inside the inner layer 100 is oil and the chemical product is a fluid, the partition layer 140 is made of natural rubber, and thus a leak is detected. When the fluid flowing inside the inner layer 100 is water, the fluid dissolves the powder mixed layer 142 that is located between the two paper layers 141 and 143 of the partition layer 140, and thus a leak can be detected.

The second electrode layer 150 is made of an electrically conductive material on the surface of the partition layer 140, and a second terminal 151 is provided at one end of the second electrode layer 150.

The high-density woven layer 160 is woven by weaving an ultra-high tenacity yarn, manufactured using polyester, on the outer circumferential surface of the second electrode layer 150.

The outer coating layer 170 is formed by fixedly coating the surface of the high-density woven yarn layer 160 with PTC to surround the outer circumferential surface of the high-density woven yarn layer 160.

Furthermore, the PVC hose with a water leak notification function according to an embodiment of the present invention includes a leak detection device that detects a water leak depending on whether current is conducted between the first terminal 131 and the second terminal 151 by a connected power source.

Figure 3:
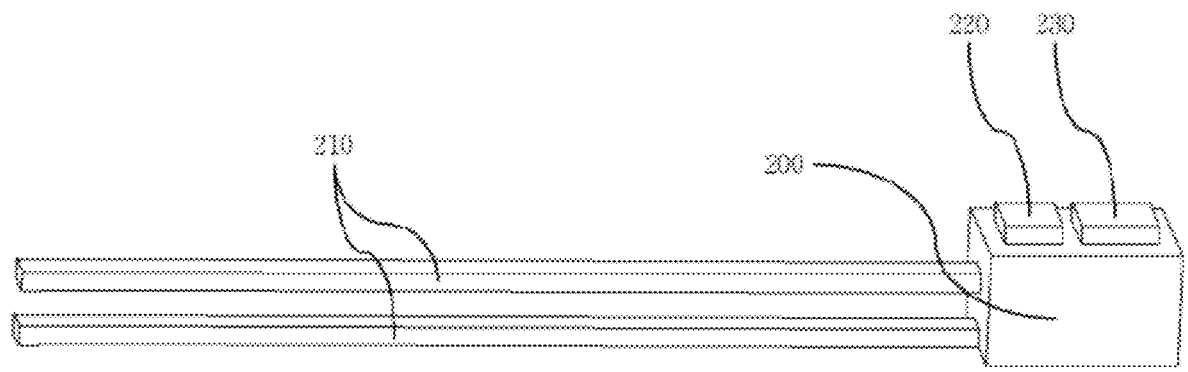
FIG. 3 is a perspective view showing a leak detection device according to an embodiment of the present invention.

FIG. 3 is a perspective view showing a leak detection device according to the embodiment.

The leak detection device includes a leak detection device body 200, two external terminal wires 210 connected to the first terminal 131 and the second terminal 151, respectively, a power supply device 220 configured to supply power to the external terminal wires 210, and a signal generator 230 connected to the external terminal wires 210 and configured to generate a signal when current is conducted due to the occurrence of a leak.

For example, when a leak of the fluid moving inside the inner layer 100 occurs, current can be conducted between the first electrode layer 130 and the second electrode layer 150. Accordingly, current is conducted between the first terminal 131 and the second terminal 151 by the power applied from the power supply 220, so that a signal is generated in the signal generator 230 and delivers information about whether there is a leak.

As described above, the present invention is the idea of providing a PVC hose with a leak notification function as its major technical spirit. The embodiment described above with reference to the drawings is only one embodiment, and the true scope of the present invention is based on the claims and will also extend to equivalent embodiments that may be present in various manners.

According to the PVC hose with a leak notification function according to the present invention, which is configured as described above, the following effects may be obtained:

According to an embodiment of the present invention, the lifespan of the PVC hose may be increased, the rupture of the PVC hose may be prevented, and it may be possible to, when the fluid flowing inside the inner layer is oil and a chemical product is a fluid as well as when the fluid flowing inside the inner layer is water, rapidly and accurately detect whether there is a leak before the fluid flowing inside the inner layer is leaked to the outside in case of damage or a crack and then provide leak notification.

Although the present invention has been described with reference to the embodiment shown in the drawings, which is merely exemplary, those skilled in the art will understand that various modifications and equivalent other embodiments may be made therefrom. Accordingly, the true technical protection scope of the present invention should be determined by the technical spirit of the appended claims.

What is claimed is:

1. A polyvinyl chloride (PVC) hose with a leak notification function, the PVC hose comprising:
    an inner layer, wherein a fluid is transferred through a hollow formed through the inner layer;
    a reinforcing yarn layer wound to surround an outer circumferential surface of the inner layer to reinforce the inner layer and restrain expansion of the inner layer;
    an intermediate layer formed through coating to surround an outer circumferential surface of the reinforcing yarn layer;
    a first electrode layer formed through coating to surround an outer circumferential surface of the intermediate layer, wherein the first electrode layer includes a first terminal at one end thereof;
    a partition layer formed through coating to surround an outer circumferential surface of the first electrode layer;
    a second electrode layer formed through coating to surround an outer circumferential surface of the partition layer, wherein the second electrode layer includes a second terminal at one end thereof;
    a high-density woven yarn layer processed to surround an outer circumferential surface of the second electrode layer;
    an outer coating layer formed through coating to surround an outer circumferential surface of the high-density woven yarn layer; and
    a leak detection device configured to determine whether there is a leak depending on whether current is conducted between the first terminal and the second terminal when power is applied to the first terminal and the second terminal.

2. The PVC hose of claim 1, wherein the fluid flowing inside the inner layer is water, and
    wherein the partition layer includes a powder mixed layer formed by adding 0.01% to 0.1% of $CaCl_2$ powder and copper powder between two paper layers and then applying a water-soluble adhesive.

3. The PVC hose of claim 1, wherein the partition layer is made of natural rubber, and
    wherein the fluid flowing inside the inner layer is oil or a chemical product.

4. The PVC hose of claim 1, wherein the inner layer is formed by extruding PVC, the reinforcing yarn layer is woven by braiding a reinforcing yarn, manufactured using polyester, on the outer circumferential surface of the inner layer, the intermediate layer is formed through coating on the outer circumferential surface of the reinforcing yarn layer by using PVC, the high-density woven layer is woven by weaving an ultra-high tenacity yarn, manufactured using polyester, on the outer circumferential surface of the second electrode layer, and the outer coating layer is formed by fixedly coating a surface of the high-density woven yarn layer with PTC to surround the outer circumferential surface of the high-density woven yarn layer.

5. The PVC hose of claim 1, wherein the leak detection device comprises:
    a leak detection device body;
    two external terminal wires extending vertically from both ends of the leak detection device body, and connected to the first terminal and the second terminal, respectively;
    a power supply device provided inside the leak detection device body, connected to any one of the two external terminal wires, and configured to supply power to the external terminal wire; and
    a signal generator provided inside the leak detection device body, connected to the external terminal wires, and configured to generate a signal in response to detecting that current is conducted between the first terminal and the second terminal.

* * * * *